United States Patent [19]
Brouillette et al.

[11] 3,820,043
[45] June 25, 1974

[54] MEANS FOR CONTROLLING IMPEDANCE CHARACTERISTICS OF ACOUSTIC DELAY LINE TRANSDUCERS
[75] Inventors: Joseph W. Brouillette, Jamesville; Edward M. Pruski, Syracuse, both of N.Y.
[73] Assignee: The United States of America as represented by the Secretary of the Army, Washington, D.C.
[22] Filed: June 12, 1973
[21] Appl. No.: 369,361

[52] U.S. Cl. ................................ 333/30 R, 333/72
[51] Int. Cl. .......................... H03h 9/26, H03h 9/30
[58] Field of Search............. 333/30 R, 72; 310/8.3, 310/9.4

[56] References Cited
UNITED STATES PATENTS
2,427,348  9/1947  Bond et al.................... 333/30 R X
2,430,013  11/1947 Hansell ........................... 333/30 R
2,590,405  3/1952  Hansell ......................... 333/30 R X
2,672,590  3/1954  McSkimin....................... 333/30 R
2,861,247  11/1958 McSkimin....................... 333/30 R
3,133,258  5/1964  Meitzler........................ 333/30 R Primary Examiner—Archie R. Borchelt
Assistant Examiner—Marvin Nussbaum
Attorney, Agent, or Firm—Lawrence A. Neureither; Leonard Flank; Robert C. Sims

[57] ABSTRACT

The exact thickness of the bond between the transducer and the delay line is established by the placing of metallic shims in the bonding material; therefore allowing control of the electrical impedance.

1 Claim, 1 Drawing Figure 3,820,043
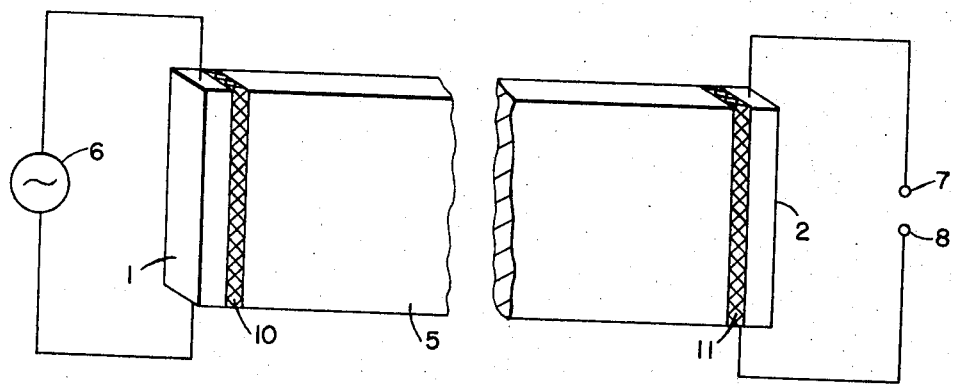

MEANS FOR CONTROLLING IMPEDANCE CHARACTERISTICS OF ACOUSTIC DELAY LINE TRANSDUCERS

SUMMARY OF THE INVENTION

An acoustical delay line is made up of two piezoelectric transducers bonded to different ends of a long thin metallic strip. Application of a signal voltage to one of the transducers causes a mechanical deformation of the transducer via the piezoelectric properties of the material. The mechanical energy so generated propagates as a wave through the metallic strip to the second transducer. This second transducer, upon undergoing wave deformation, causes the voltage to appear at its output terminals. Since the appearance of the output voltage is delayed in time by the amount it takes for the mechanical wave to traverse the metallic strip, the device serves as a delay line for an electrical signal.

It has been found that a tight bond of the transducer to the metallic strip results in electrical impedances which are not suitable for using in a band-pass filter approach. However, by inserting small metallic shims between the transducer and metal, in the bond solder, the transducer is slightly decoupled, and the resulting electrical impedance is quite suitable.

BRIEF DESCRIPTION OF THE DRAWING

The single FIGURE illustrates a preferred embodiment of the invention.

DESCRIPTION OF THE PREFERRED EMBODIMENT

The acoustic delay line is shown in the FIGURE and is made using piezoelectric transducers 1 and 2 bonded by any of the well known bonding materials to the parallel ends of a metal strip 5. Application of a signal voltage 6 to transducer 1 causes mechanical deformations of the transducer via the piezoelectric properties of the material. The mechanical energy so generated can propagate as a wave through the metal strip 5 to the transducer 2. Transducer 2, upon undergoing wave deformation, will cause to appear at its output electrical terminals 7 and 8 a voltage identical to signal voltage 6 due to the reciprocal character of the piezoelectric effect. Since the appearance of the output voltage is delayed in time by the amount it takes for the mechanical wave to traverse the metal strip, the device serves as a delay line for electrical signal 6.

The wave transmitted may be either shear or longitudinal. In metal strips whose dimension is comparable to one wavelength, the longitudinal mode may suffer delay distortion, due to the dispersive nature of the longitudinal waves. The shear mode is non-dispersive, and hence desirable for a non-dispersive line.

The electrical impedance presented to the external terminals of the transducer depends on the dimensions of the transducer, on the elastic and piezoelectric properties of the transducer material, on the properties and thickness of the bonding material, and on the elastic properties of the metal in the delay strip. Of particular interest in the present invention is the ratio of specific acoustic impedance of the transducer material to that of the metal.

This electrical impedance governs the efficiency of conversion of electrical energy to mechanical energy and vice versa, and hence the amplitude of the output signal and insertion loss of the delay line. Since the impedance varies with frequency, so also does the insertion loss. Various matching schemes are used to present a more constant impedance to the generator and load (not shown) to obtain wider bandwidth devices.

One of the most successful schemes is where the electrical parameters are measured, and the equivalent circuit of the transducer has added to it external electrical elements to form a band pass filter section. This is widely used in broadband delay lines, particularly with longitudinal transducers.

In buidling non-dispersive acoustic delay lines, using shear transducers, if the shear transducer is bonded as tightly as possible to the metal, the resulting electrical impedance is not suitable for using the band-pass filter approach. However, if small metal shims are inserted between transducer and metal (in the bonding solder), the transducer is slightly decoupled, and the resulting electrical impedance variation of the transducer is quite suitable for the filter-matching scheme. This permits the realization of broadband, low-loss, non-dispsersive acoustic lines using shear modes in a strip. The width of the shims is selected to cause the transducers to be bonded to the strip a desired distance therefrom. In this way the amount of decoupling is predetermined.

The metal strip of FIG. 1 could typically be 1 inch by 0.025 inches. The width of the shim 10 and 11 could each be 0.001 inches which distance can be determined by the use of two strips of copper wire mesh 0.001 inch in diameter. These dimensions are only given by way of a specific example and other dimensions can obviously be used.

We claim:

1. A delay line comprising a metallic strip; first and second transducers; bonding means; and first and second transducers being bonded to opposite ends of said metallic strip by said bonding means; shim means located in said bonding means so as to cause said transducers to be bonded to the metallic strip at a predetermined distance therefrom; said first and second transducers being piezoelectric transducers; a signal means connected to said first transducer; output terminals connected to said second transducer; and wherein said shim means are made up of mesh copper wire so as to cause a slight decoupling of the transducer to the metallic strip.

* * * * *